United States Patent
Fukada

(10) Patent No.: US 6,538,963 B1
(45) Date of Patent: *Mar. 25, 2003

(54) OPTICAL DISK AND RECORDING/ REPRODUCING DEVICE THEREOF

(75) Inventor: Hajime Fukada, Tokyo (JP)

(73) Assignee: LG Electronics Inc., Seoul (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,994

(22) Filed: Jun. 4, 1997

(30) Foreign Application Priority Data

Jun. 4, 1996 (JP) .............................. 8-141996

(51) Int. Cl.[7] .............................................. G11B 7/00
(52) U.S. Cl. .............................. 369/44.13; 369/275.3; 369/47.27
(58) Field of Search ..................... 369/13, 32, 44.26, 369/124, 275.3, 275.4, 275.2, 44.13, 47.27

(56) References Cited

U.S. PATENT DOCUMENTS

| | | | | |
|---|---|---|---|---|
| 4,858,221 A | * | 8/1989 | Romeas ..................... | 369/275.3 |
| 5,422,874 A | * | 6/1995 | Birukawa et al. ......... | 369/275.2 |
| 5,444,682 A | * | 8/1995 | Yamada et al. ............. | 369/32 |
| 5,452,284 A | * | 9/1995 | Miyagawa et al. .......... | 369/124 |
| 5,475,662 A | * | 12/1995 | Miyagawa et al. ........ | 369/44.26 |
| 5,508,995 A | * | 4/1996 | Moriya et al. ............ | 369/275.4 |
| 5,638,354 A | * | 6/1997 | Nakayama et al. ........ | 369/275.3 |
| 5,737,307 A | * | 4/1998 | Shimizu .................... | 369/275.4 |
| 5,740,154 A | * | 4/1998 | Izumi et al. .............. | 369/275.3 |
| 5,754,506 A | * | 5/1998 | Nagasawa et al. ........ | 369/44.26 |
| 5,805,565 A | * | 9/1998 | Miyamoto et al. ........ | 369/275.4 |
| 5,835,479 A | * | 11/1998 | Miyagawa et al. ........ | 369/275.2 |
| 5,872,767 A | * | 2/1999 | Nagai et al. .............. | 369/275.3 |
| 5,898,663 A | * | 4/1999 | Miyamoto et al. ........ | 369/275.4 |
| 5,982,738 A | * | 11/1999 | Miyamoto et al. ........ | 369/275.3 |

FOREIGN PATENT DOCUMENTS

| JP | 146507 | | 7/1985 |
|---|---|---|---|
| JP | 7-057302 | * | 3/1995 |

OTHER PUBLICATIONS

Japanese J. Appl. Phys., vol. 32 (1993) pp. 5324–5328.

* cited by examiner

Primary Examiner—Nabil Hindi
(74) Attorney, Agent, or Firm—Birch, Stewart, Kolasch & Birch, LLP

(57) ABSTRACT

Optical disk and recording/reproducing device for the optical disk are disclosed, the optical disk including alternating spirals of ridged land track and grooved groove track having substantially the same widths for recording data in high density on both of the tracks, each of the land track and the groove track having a plurality of sectors, each sector having a first region and a second data recording region, the first region having synchronization marks and sector address marks wobbled with an amplitude about a half of the width of the land track and the groove track from respective track centers for plurality of times, for example two times; and the recording/reproducing device having means for detecting the land track and the groove track.

28 Claims, 9 Drawing Sheets

OPTICAL DISK AND RECORDING/REPRODUCING DEVICE THEREOF

BACKGROUND OF THE INVENTION

1. Field of the Invention

The present invention relates to an optical disk and a recording/reproducing device thereof.

2. Discussion of the Related Art

Currently, when of information is recorded on an optical disk which has a 1.6$\mu$ pitched spiral guide track of a recessed straight groove of about an ⅛ wavelength depth(called "groove track"), a data mark 9 corresponding to the information is recorded either on the recessed groove track or on a land track positioned between two recessed groove tracks. A laser beam, which is modulated according to a coded data, is focused on a micron spot of a size of less than 1$\mu$ while optically detecting and tracking the center of the groove track using an actuator so as to record the information thereupon tracking the groove track by means of an actuator. DRAW(Direct Read After Write) recording media such as As—Te—Se, magnetic recording media such as Tb—Fe—Co, or phase change recording media such as Ge—Sb—Te are used as recording media. When reproducing the mark on the groove track thus recorded, a laser beam of a preset power is focused on a micron spot on the groove track having a size of less than 1$\mu$ while optically identifying and tracking the groove track. Conventionally, the push-pull tracking has been used the optically track the groove track in a recording/reproduction.

The conventional push-pull tracking will be explained with reference to FIGS. 5a, 5b, 6a and 6b.

Referring to FIGS. 6a and 6b, in a conventional pre-groove system, data is recorded/reproduced in sector units, with 20~40 sectors in a turn of a track pitched in general 1.6$\mu$. Each sector has a header region 2 and a data recording region 3 in a groove 4 of about ⅛ wavelength depth. The header region 2 has wobble pits 6 and 7, and a sector mark 5, shown in FIG. 6b, consisting of a VFO(Variable Frequency Oscillator) 11 of continuous data pattern for locking a PLL(Phase Locked Loop), an AM(Address Mark) 12, a sector address identifier(ID) 13, an IEC(Identifier Error Corrector) 14 for detecting an error in the sector address identifier 13, and a postamble(PA) 15.

The wobble pits 6 and 7 on both sides of a center line 10 of the groove track 4 in the header region of FIG. 6a are provided for solving problems following from aberrations of the optical spot 8 from the center line 10 during recording or reproduction caused by an error in a push-pull tracking signal detected from a reflected/diffracted signal at the pre-groove 4 coming from a slight adjustment deviation in the optical system. In other words, the error in the push-pull tracking signal is corrected to keep the optical spot always on the track center line 10 using the unbalance of optical spot 8 intensities back from the pair of wobble pits 6 and 7 caused when an error occurs in the push-pull signal and the optical spot comes out of the center line 10 of track 4. This is a known art disclosed in JP Laid Open Patent No. S62-8341 for an composite type optical disk.

Currently, in order to record more data in an optical disk, land.groove recording is suggested in which, data is recorded on both of the land track and the recessed track to double a track density as shown in FIGS 5a and 5b. This land.groove recording is disclosed in papers such as N. Miyagawa, Y. Gotoh, K. Nishiuchi, E. Ohno and N. Akahira; "Land and Groove recording for high track density on phase change optical disks", Jpn. J. Appl. Phys. 32, 5324/5328 (1993). In the push-pull tracking employed for optical tracking of the land, and groove tracks, a higher precision of tracking is required, and a slight adjustment deviation in the optical system causes a track offset which in turn causes a problem that the optical spot deviates from the center line of the land, or groove track during recording or reproduction. Consequently, even if the composite system disclosed in the JP Laid Open Patent No. S62-8341 is used, the land.groove disk still has difficulties correcting track offset errors which occur in the push-pull tracking such as incapability of disposal of the two wobble pits on both sides of the groove or land track that tend to occur when widths of the groove and land tracks become smaller to about 0.7$\mu$.

Moreover, as shown in FIGS. 5a and 5b, each of the header regions 2 of the land track and the groove track should be provided with a synchronization mark and sector marks 5 such as a sector address. However, since a diameter of the optical spot is about 1$\mu$, an exact reproduction of sector information is not possible when attempting to read a sector mark 5 on, for example, a groove track because there is leakage of a sector mark signal at the side of the sector mark 5 to be read if the widths of the groove and land tracks become smaller than about 0.7$\mu$.

The tasks of the present invention for solve the aforementioned problems will be explained with reference to FIGS. 5a and 5b taking the composite type optical disk using so called land groove disk, in which data is recorded on both of the groove track and the land track, as an example.

FIGS. 5a and 5b illustrate header regions of the composite type having the wobble pits known from the JP Laid Open Patent No. S62-8341 employed for use in suppressing an offset of a push-pull signal in the land.groove recording which doubles a track density by recording data on both of the land track 16 and recessed groove track 17 for providing a greater recording capacity in the optical disk. Referring to FIGS. 5a and 5b, the push-pull tracking used to optically track the land track 16 or the groove track 17 requires higher precision tracking as a width of each of the land track 16 and the groove track 17 approaches about 0.7$\mu$, which is about one half of the track pitch p=1.6$\mu$ of the conventional disk shown in FIG. 6a. Consequently an optical spot 8 comes out of a track center line 18 or 19 of the land track or the groove track. To correct the deviation, the wobble marks 6 and 7, should be added to each of the header regions 2 of the land track 16 and the groove track 17. However, if a width of each of the land and groove tracks decreases to about 0.7$\mu$, it becomes difficult to reproduce wobble marks 6 and 7 having diameters of 0.35$\mu$ which is half of the track width of p=0.7$\mu$ as shown in FIGS. 5a and 5b, using a focused optical spot having a diameter D calculated to be D=1.1 by an equation D=$\lambda$/NA, where $\lambda$ is a wavelength and NA is a numerical aperture, when $\lambda$ is set to 0.65$\mu$ and NA is set to 0.6. Consequently, problems in data recording/reproduction of the land.groove disk of narrow track widths are caused, such as incapability of correction of the offset occurring during the push-pull tracking, that significantly impedes putting the land.groove disk into practical use.

In addition, referring to FIGS. 5a and 5b again, besides the wobble marks 6 and 7, each of the header regions 2 of the land track 16 and the groove track 17 has, as shown in FIG. 6b, a sector mark 5 consisting of a VFO 11 of continuous data pattern for locking a PLL, an AM 12 being an address mark, a sector address identifier(ID) 13, an IEC 14 for detecting an error in the sector address identifier 13, and a postamble(PA) 15. If a width of each of the land and groove tracks becomes smaller to about 0.7μ, the large optical spot of 1.1μ diameter is likely to experience difficulties distinguishing VFO mark 11 in the header region 2 of the land track 16 from VFO mark 11 in the header region 2 of the adjacent groove track 17 due to cause cross-talk, which is a great cause of the error which occurs when reading in the signal of the header region 2, a problem in making the tracks of the land.groove disk narrower, and a significant obstacle in putting the land.groove disk into practical use.

Still further, referring to FIGS. 5a and 5b too, in the push-pull detection of the optically diffracted beams from the land track 16 and the groove track 17 employed in optical tracking the land track 16 and the groove track 17, polarities of push-pull signals of the land track 16 and the groove track 17 are opposite to each other because the land track 16 and the groove track 17 are formed opposite to each other. Consequently, it is necessary to determine whether the optical spot 8 tracks the land track 16 of the groove track and to invert a polarity of one side push-pull tracking signal. However, no method dependable exits for determining whether corresponds to a track a groove or a land, which is a significant obstacle in putting the land.groove recording into practical use.

SUMMARY OF THE INVENTION

Accordingly, the present invention is directed to an optical disk and a recording/reproducing device thereof that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical disk includes a land track and a groove track formed in a form of alternating spirals with widths substantially the same with the other, one turn of each of the land track and the groove track having a plurality of sectors ranging 15~45, each sector having a first region and a second data recording region, the first region having information pits such as synchronization marks and sector address marks formed in a radial direction of the optical disk and wobbled with an amplitude about a half of the width of the land track and the groove track from respective track centers on both sides thereof, and a depth of a wobbled mark being adapted to be detected by a push-pull signal.

In other aspect of the present invention, there is provided a recording/reproducing device including means for rotating the optical disk, means for directing a light beam onto the optical disk, and means for receiving the light beam reflected at a wobbling mark in a first region of each sector through a two-piece detector, determining a track of being a land track or a groove track from a push-pull signal of the received light beam, and carrying out recording/reproduction of information on/from a second data recording region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2C illustrates a configuration of several blocks of sector marks and a configuration of several header marks, including a conversion point between land and groove tracks;

DETAILED DESCRIPTION OF THE PREFERRED EMBODIMENT

Reference will now be made in detail to the preferred embodiment of the present invention, examples of which are illustrated in the accompanying drawings.

Figure 1:
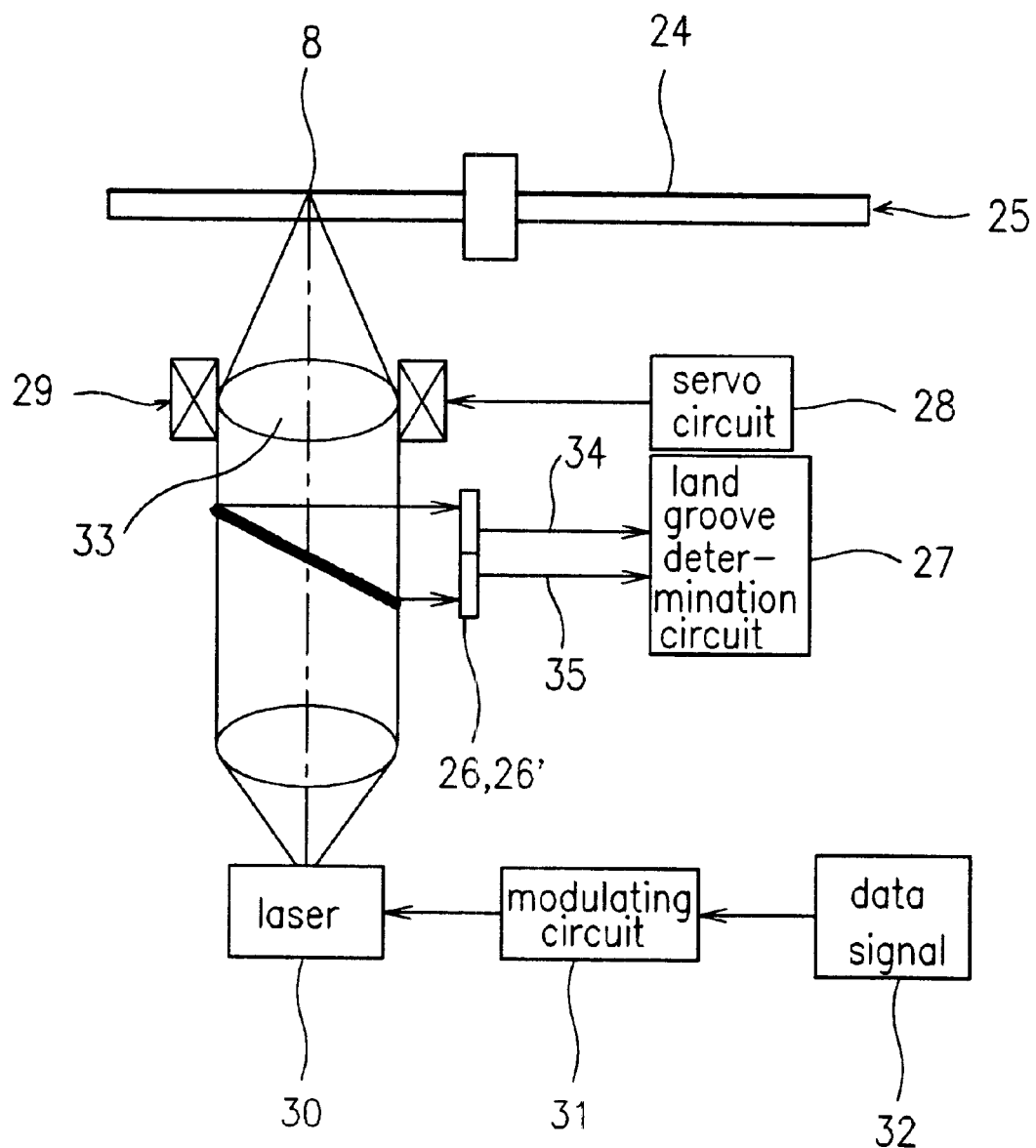
FIG. 1 illustrates a block diagram of a recording/reproduction device for recording/reproduction of information used in reproduction of a land.groove disk in accordance with a preferred embodiment of the present invention.

FIG. 1 explains an optical disk recording/reproduction device in accordance with a preferred embodiment of the present invention.

Referring to FIG. 1, there is a phase change film or a optomagnetic film 24 formed on a disk substrate 25. A light beam emitted from a laser element 30 forms an optical spot 8 on a recording film by a lens 33. The laser element 30 used herein is a semiconductor laser having a wavelength $\lambda=0.63{\sim}0.78\mu$, and the lens 33 used herein has an NA(Numerical Aperture)=0.55~0.60. A modulator 31 modulates a data signal 32 into a code to modulate the semiconductor laser 30 and record information on a land track 16 or a groove track 17 formed on the disk substrate 25.

Figure 2A:
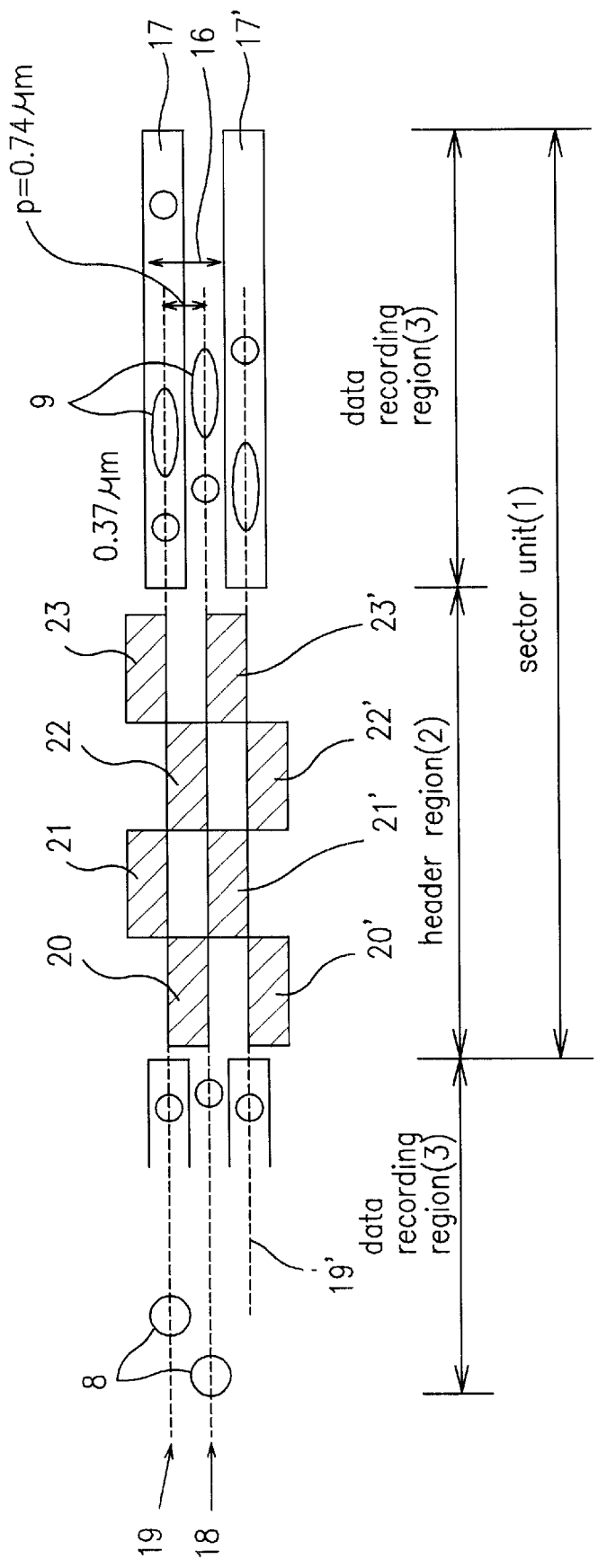
FIGS. 2a and 2b illustrate a configuration of one block of sector marks and a configuration of header mark wobbled a plurality of times in the land.groove disk used in the present invention.
Figure 2B:
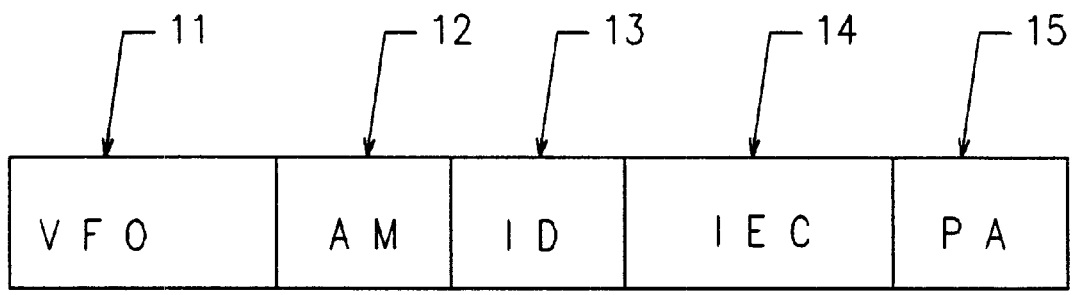

FIGS. 2a and 2b explain an optical disk recording/reproduction device in accordance with a preferred embodiment of the present invention.

Referring to FIGS. 2a and 2b, it is necessary that the optical spot 8 is always on a center 18 of the land track or on a center 19 of the groove track at recording/reproduction of a data on/from the land track 16 or the groove track 17 in a data recording region 3. In general, this is done by detecting signals 34 or 35 of a push-pull reflected and diffracted light beam from the land track 16 or the groove track 17 in the data recording region 3 with the two-piece optical detector 26 shown in FIG. 1, and determining a polarity of a push-pull signal, which is a differential signal, with a determination logic circuit 27, which is one embodiment of the present invention, to control the polarity of a tracking signal to drive a lens actuator 29 with a servo circuit 28, thereby the optical spot 8 is always made to track the center 18 or 19 of the land track 16 or the groove track 17.

FIG. 2a illustrates a configuration of a land.groove disk in accordance with one embodiment of the present invention, wherein one turn of each track includes 10~40 sectors 1. In one embodiment of the present invention, one turn of the track is made to have 19 sectors in an inner circumference of the disk and 40 sectors in an outer circumference of the disk for improving a recording density. Referring to FIG. 2a, each of the land track 16 and the groove track 17 has a width of about p=0.7μ, and a depth of about an ⅙ wavelength, and the land track 16 and the groove track 17 are formed in a form of alternating spirals. A header region 2 in each of the sectors 1 has sector marks shown in FIG. 2a with a depth of about an ⅙ wavelength recorded repeatedly thereon. In FIG. 2b, there are shown the sector mark consisting of a VFO 11 of continuous data pattern for locking a PLL, an AM 12 being an address mark of a special code pattern for indicating a position for starting reading a coded data, a sector address number identifier(ID) 13, an IEC 14 for detecting an error in the sector address identifier 13, and a postamble(PA) 15. In FIG. 2a, showing one embodiment of the present invention, a plurality of the sector marks, for example 4 sector marks 20, 21, 22 and 23, are arranged in a radial direction of the disk centered on a track center 19 of the groove track 17 on both sides of the track center 19 wobbled in an amplitude a half of a width of the track, i.e., 0.35μ. And, similarly, a plurality of the sector marks, for example 4 sector marks 20', 21', 22' and 23', are arranged in a radial direction of the disk centered on a track center 19 of a groove track 17' adjacent to the groove track 17 on both sides of the track center 19 wobbled in an amplitude a half of a width of the track, i.e., 0.35μ. Therefore, as a result, the land track 16 has four sector marks 20, 21', 22 and 23' arranged in zigzag wobbled on both sides of the track center by a half of the track width, i.e., 0.35μ. Though the sector marks have two pairs of wobble marks in this embodiment, the sector marks may have one pair of wobble mark (20 and 21) and (20' and 21').

In the land.groove configuration shown in FIG. 2a in accordance with one embodiment of the present invention, four sector marks, for example, 20, 21, 22 and 23 are arranged, not side by side, but wobbled in zigzag. Since the diameter D of the optical spot, which is a 14% from the center of the optical spot is D=1.1μ according an equation D=λ/NA, where λ is a wavelength of laser beam and NA is numerical aperture, when λ=0.65 and NA=0.6, the optical spot can make a reproduction without any problem, even if the optical spot is offset by 0.35μ from the track center. Moreover, as the wobbled sector marks are arranged in a form of grating so as not to laid side-by-side, a good quality reproduction is available because there is no cross-talk with a sector mark in an adjacent track.

In the land.groove configuration shown in FIG. 2a in accordance with one embodiment of the present invention, as the polarity(notation) of a push-pull tracking servo signal is opposite depending on whether the track is a groove or a land, a position of the optical spot 8 on the groove or land track should always be detected so that the polarity of the servo signal is accorded to the position. One embodiment of the present invention in detecting whether track is positioned at a grooved portion or ridged portion will be explained.

Of the sector marks, each having VFO, AM, ID, IEC and PA as shown in FIG. 2b, a signal for determining a land or a groove in accordance with one preferred embodiment of the present invention is inserted in the PA or the others. That is, if different code patterns are inserted in positions of the PA marks in the sector marks of, for example, the groove track 17 and the next groove track 17', i.e., one byte of code patterns of m=(00000000) in the groove track 17 and one byte of code patterns of n=(00001111) in the groove track 17', as can be known from the wobbled sector mark configuration of the present invention shown in FIG. 2a, code patterns of (m, m, m, m) are detected in succession when the optical spot 8 tracks the groove track 17 or code patterns of (n, n, n, n) are detected in succession when the optical spot 8 tracks the adjacent groove track 17'. However, if the optical spot 8 tracks the sector marks provided repeatedly on the land track 18, a reproduction signal of different series of code patterns of (m, n, m, n) is detected. It is also possible to use a repeatedly inserted sector address number ID 13 as the code patterns for determining land or groove. Thus, in formation of the disk, by providing the sector marks in the header region wobbled in an amplitude half of the track width from the center line of the groove and inserting different code patterns in a portion of the sectors at every turn of the track, the determination of whether the optical spot is positioned at the land track or the groove track can be easily made, making it easier to keep the optical spot on the center of the land track 16 or the groove track 17 by determining the polarity of the tracking signal with the land.groove track determination logic circuit 27 and driving the lens actuator 29 through the servo circuit 28 shown in FIG. 1. FIG. 2C illustrates a configuration of several blocks of sector marks and a configuration of several header marks, including a conversion point between land and groove tracks. One of ordinary skill would readily appreciate the configuration of the conversion point between a land and groove track shown in FIG. 2C from the above description of data stored in header areas of land and groove tracks and the spiral configuration of the land and groove tracks.

Figure 3A:
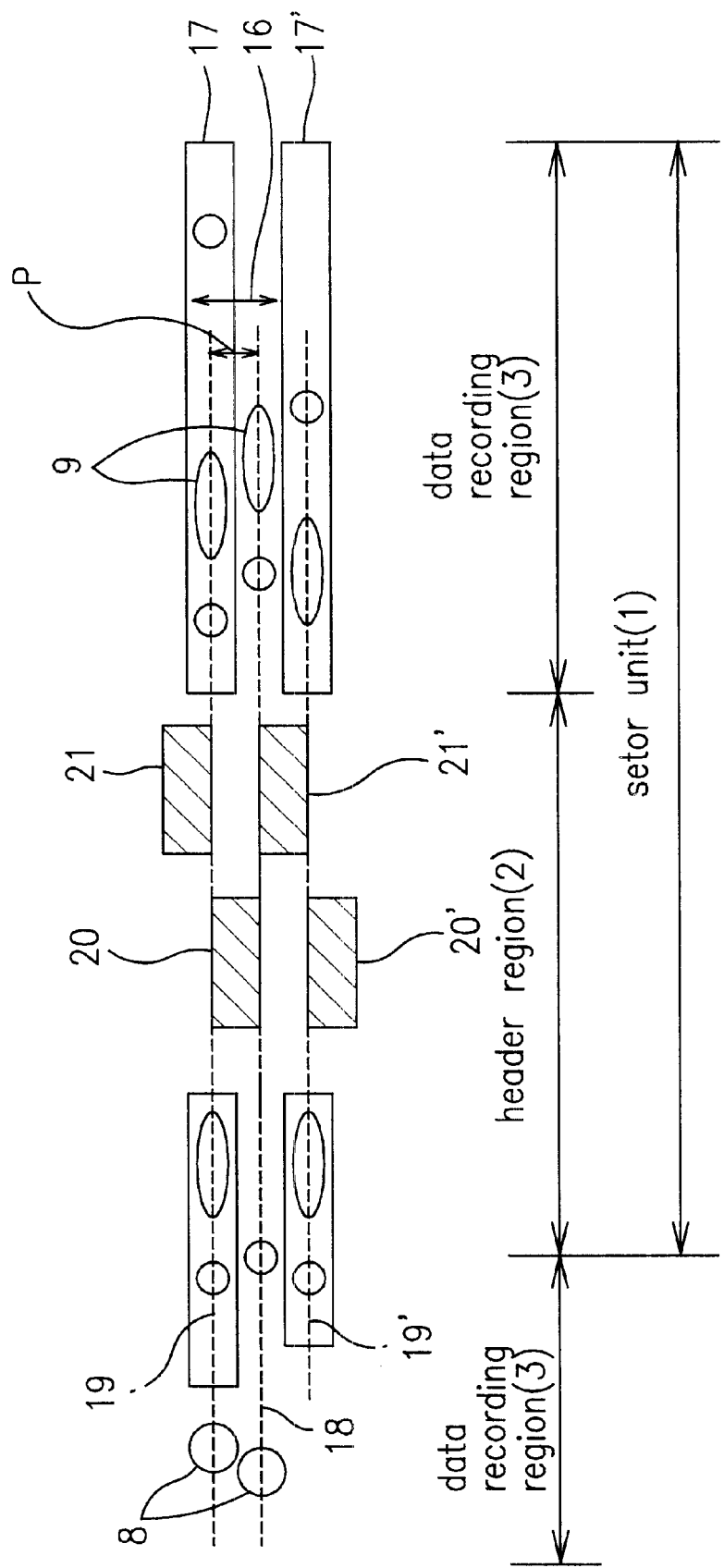
FIGS. 3a and 3b illustrate a configuration of one block of sector marks and a configuration of header mark wobbled a plurality of times in the land.groove disk used in the present invention.
Figure 3B:
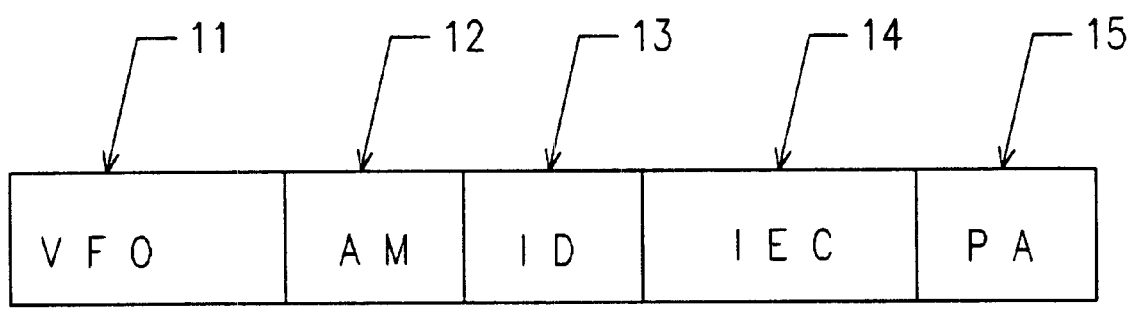

Shown in FIGS. 3a and 3b are configurations of a disk in accordance with another embodiment of the present invention, wherein two sector marks are shown, which may be of one pair of wobble marks. In the land.groove configuration shown in FIG. 3a of one embodiment of the present invention, when data is recorded in the data region 3, since the push-pull tracking signal from signals 34 or 35 shown in FIG. 1 detected from the data region 3 will have the other polarity(notation) depending on a position of the spot 8 being on the land 16 or groove 17, the position of the spot 8 located on the land 16 or groove 17 must to change the polarity of a servo signal as the occasion demands. One embodiment of the present invention for detecting the position of the optical spot being on the land 16 or groove 17 of the track will be explained with reference to FIGS. 4a and 4b.

Figure 4A:
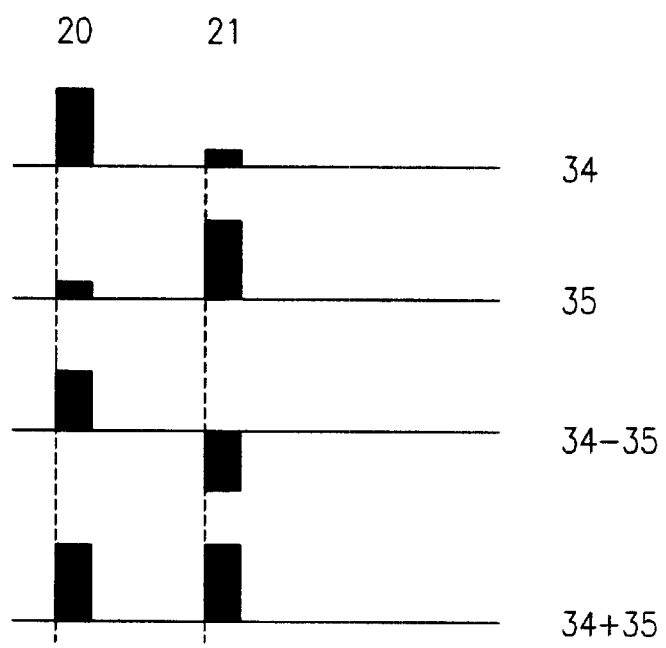
FIGS. 4a and 4b illustrate waveforms of wobbling marks from a two-piece optical detector in the land.groove disk used in the present invention.
Figure 4B:
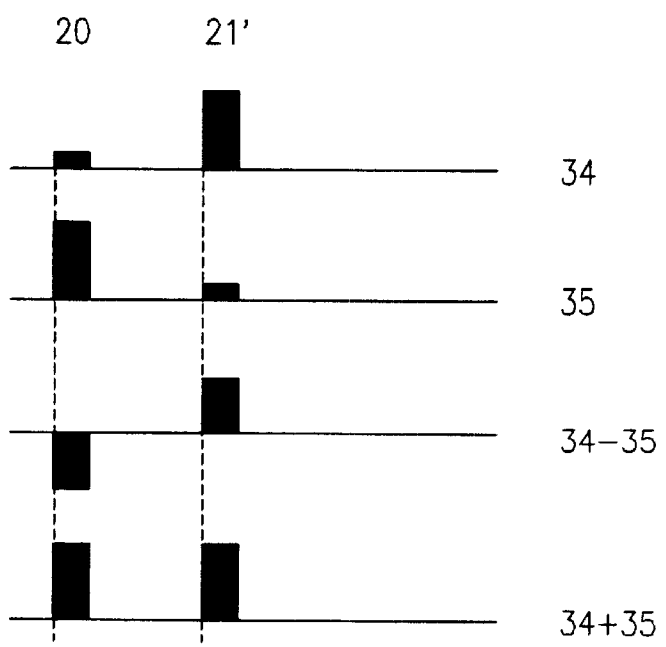
Figure 5A:
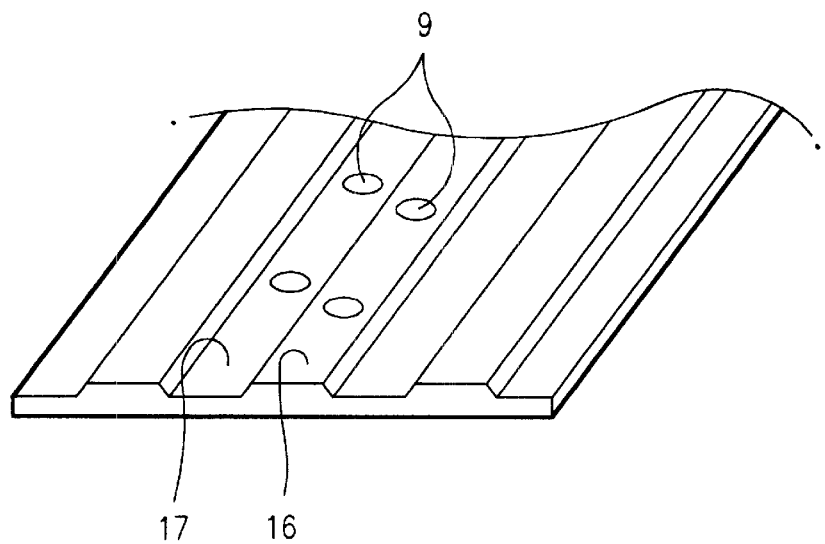
FIGS. 5a and 5b illustrate land tracks, and groove tracks each with a header region having wobble marks for correcting push-pull track, and a configuration of the header region; and, FIGS. 6a and 6b illustrate a configuration of a disk of a conventional push-pull tracking type having a composite type with wobble marks applied thereto and a configuration of a header region thereof.
Figure 5B:
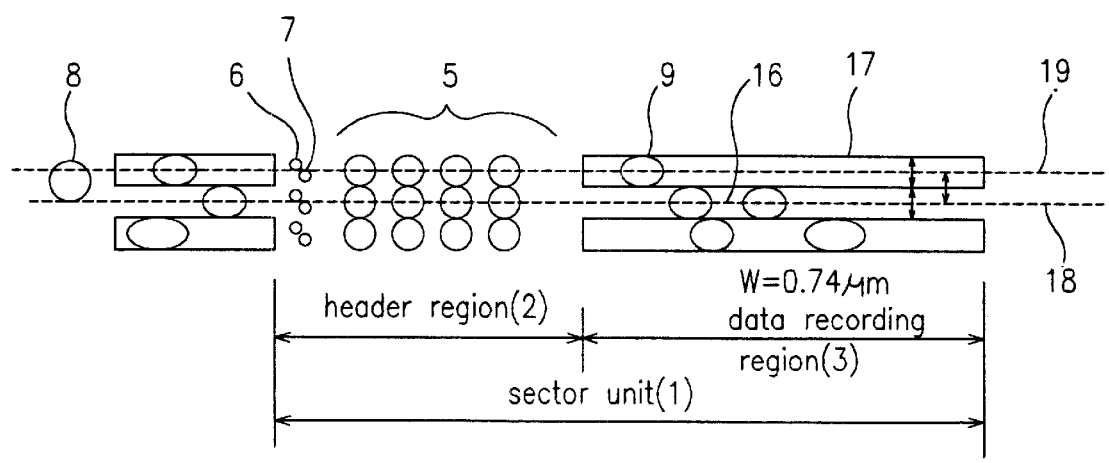
Figure 6A:
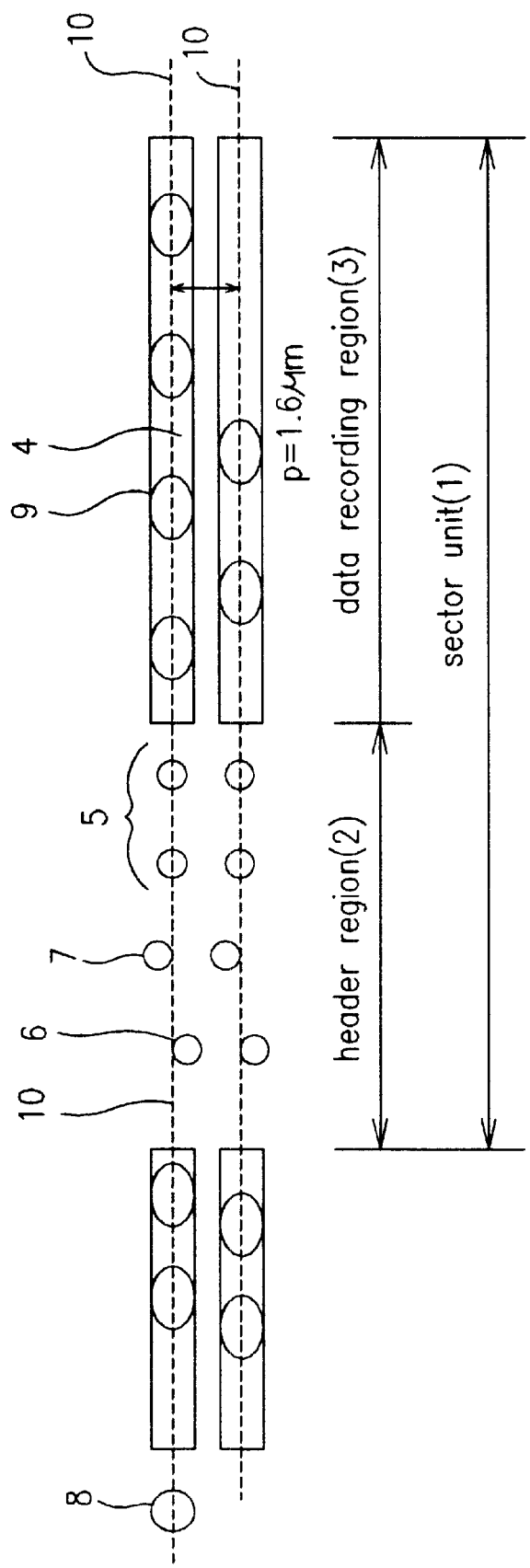
Figure 6B:
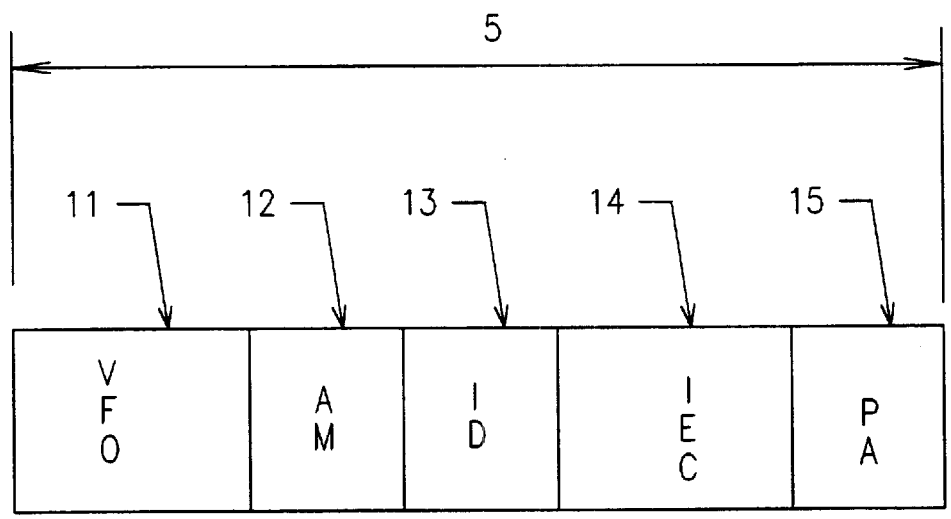

FIGS. 4a and 4b illustrate the signals 34 and 35 from the two-piece optical detector 26 shown in FIG. 1 obtainable when the wobbled sector marks 20, 21, 20' and 21' in the header region 2 shown in FIG. 3a are reproduced when the optical spot scans the land and groove tracks, and signals of the difference (34−35), and summation (34+35) FIG. 4a illustrates signals generated when the optical spot 8 is on the land track 16 and FIG. 4b illustrates when the optical spot 8 is on the groove track 17. From FIGS. 4a and 4b, it can be known definitely that the polarities of the signals 34 and 35 and the signals of the difference (34−35) are inverted by the land and the groove. Therefore, the drive optical drives can easily determined whether the optical spot is on the land track furthermore or the groove track, referring to FIG. 1, it is possible to keep the optical spot 8 always on the center of the land track 16 or the groove track 17 by determining the polarity of the tracking signal with the land.groove track determination logic circuit 27 and driving the lens actuator 29 through the servo circuit 28.

If there is an adjustment deviation in the optical system, the push-pull tracking signal detected by an optical diffraction in the land.groove track, reflects the fact that the optical spot does not scan the track center. Specifically, an extent of the offset can be detected by comparing levels of signals each of which is a sum of the signals 34 and 35 from the two-piece detector 26 of the one pair of the sector marks wobbled from the track center of one embodiment of the present invention. For example, the detection of the offset is possible by comparing signal levels of the wobbled sector marks 20 and 21 in one embodiment of the present invention. Accordingly, a polarity correction of the push-pull signal from the data recording region is possible, such that the optical spot can always track the track center.

As shown in FIGS. 2a and 2b corresponding to one embodiment of the present invention, a change of the polarity of the push-pull signal is required in the land track and groove track. As explained, the determination of the land.groove is made possible by having a data pattern different from an adjacent track inserted in the PA of a sector mark of one embodiment of the present invention in advance. Moreover, the determination of the land track or the groove track is also possible based on the push-pull signal of the signals of the wobbled sector marks as shown in FIGS. 3a and 3b detected by the two-piece detector. Accordingly, the optical spot can always be kept to track a predetermined track center, and an offset correction of the push-pull signal is also made possible by the wobble marks. Referring to FIGS. 2a and 3a of the present invention, though a width of each of the land track and the groove track is $0.7\mu$ which represents and an amplitude of the wobble is $0.35\mu$ a half of the width, the track width is not necessarily limited to this same proportionality.

The optical disk of the present invention facilitates differentiation between the land track and the groove track and exact tracking of the optical spot along the track center without an offset, whereby exact data recording/reproduction is allowed and a recording/reproduction device which can record/reproduce high density information on/from the optical disk is made available.

It will be apparent to those skilled in the art that various modifications and variations can be made in the optical disk and the recording/reproducing device of the present invention without departing from the spirit or scope of the invention. Thus, it is intended that the present invention cover the modifications and variations of this invention provided they come within the scope of the appended claims and their equivalents.

What is claimed is:

1. A disk recording medium on which information is recordable in an optically readable form, the recording medium comprising:

a spiral of land and groove tracks formed on said recording medium, each said land and groove track corresponding to a rotation of said recording medium with respect to a radius of said recording medium;

a plurality of sectors formed on each of said land and groove tracks;

first and second data recording regions formed in each sector;

a header formed in each of said first data recording regions, said header being wobbled in a radial direction of said recording medium; and information used to discriminate between a land and groove track and being included within said header as data information recorded on the recording medium, said information not being address information.

2. The recording medium of claim 1, wherein said information accounts for less than all of the data included in said header.

3. The recording medium of claim 1, wherein said information corresponds to a pattern of several bits.

4. The recording medium of claim 1, wherein said information is a post amble of said header.

5. A recording device for recording information on a recording medium capable of recording information in an optically readable form, the recording medium including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, the recording device comprising:

a generator to generate a header for each sector such that said header is wobbled in a track radius direction relative to a center of each of said land and groove tracks, said header including information that is data information recorded on the recording medium and used to discriminate between a land and groove track, and a controller to control the generator so that said information is not address information.

6. The recording device of claim 5, wherein said information accounts for less than all of the data included in said header.

7. The recording device of claim 5, wherein said information corresponds to a pattern of several bits.

8. The recording device of claim 5, wherein said controller controls said generator such that said information forms a post amble of said header.

9. A reproducing device for reproducing information on a recording medium capable of recording information in an optically readable form, the recording medium including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, a header formed in each of said first data recording regions, said header being wobbled in a radial direction of said recording medium, and information included within said header as data information recorded on the recording medium and used to discriminate between a land and groove track, the information not being address information, the reproducing device comprising:

a signal detector to detect a signal generated when an injected beam passes through the first region and to read said information included in the header; and a track identifier to determine whether the injected beam is on said land or said groove track.

10. The reproducing device of claim 9, wherein said information accounts for less than all of the data included in said header.

11. The reproducing device of claim 9, wherein said information is a post amble of said header.

12. The reproducing device of claim 9, further comprising:

a polarity inverter to invert a polarity of a tracking error signal in response to whether said injected beam is on said land or groove track.

13. A recording method for recording information on a recording medium capable of recording information in an optically readable form, the recording method including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, the recording method comprising:

generating a header for each sector such that said header is wobbled in a track radius direction relative to a center of each of said land and groove tracks, said header including information that is data information recorded on the recording medium and used to discriminate between a land and groove track; and controlling said generating so that said information is not address information.

14. The recording method of claim 13, wherein said information accounts for less than all of the data generated in said header.

15. The recording method of claim 13, wherein said information corresponds to a pattern of several bits.

16. The recording method of claim 13, wherein said controlling controls said generating step such that said information forms a post amble of said header.

17. A reproducing method for reproducing information on a recording medium capable of recording information in an optically readable form, the recording medium including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, a header formed in each of said first data recording regions, said header being wobbled in a radial direction of said recording medium, and information included within said header as data information recorded on the recording medium for discriminating between a land and groove track, said information not being address information, the reproducing method comprising:

detecting a signal generated when an injected beam passes through the first region and to read said information included in the header; and identifying whether the injected beam is on said land or said groove track.

18. The reproducing method of claim 17, wherein said information accounts for less than all of the data included in said header.

19. The reproducing method of claim 17, wherein said information is a post amble of said header.

20. The reproducing method of claim 17, further comprising:

inverting a polarity of a tracking error signal in response to whether said injected beam is on said land or groove track.

21. A reproducing device for reproducing information from an information recording medium capable of recording information in an optically readable form, the recording medium including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, a header formed in each of said first data recording regions, said header being wobbled in a radial direction of said recording medium, the reproducing device comprising:

a signal detector detecting signals generated when injected beams pass through the first data recording region and reading the header including information being data information recorded on the recording medium for discriminating between a land and groove track, said information not being address information;

a push-pull signal producer producing a push-pull signal in response to the signals detected by said signal detector;

a land and groove converter-determiner determining a polarity variation of the produced push-pull signal and a changing of the header data; and a polarity inverter inverting a polarity of a tracking error signal detected in response to the determining results of said land and groove converter-determiner.

22. The reproducing device of claim 21, wherein said information accounts for less than all of the data included in said header.

23. The reproducing device of claim 21, wherein said information corresponds to a pattern of several bits.

24. The reproducing device of claim 21, wherein said information is a post amble of said header.

25. A reproducing method for reproducing information from a recording medium capable of recording information in an optically readable form, the recording medium including a spiral of land and groove tracks formed on said recording medium, each said land and groove track corresponding to a rotation of said recording medium with respect to a radius of said recording medium, a plurality of sectors formed on each of said land and groove tracks, first and second data recording regions formed in each sector, a header formed in each of said first data recording regions, said header being wobbled in a radial direction of said recording medium, and information included within said header as data information recorded on the recording medium for discriminating between a land and groove track, said information not being address information, the reproducing method comprising:

detecting signals generated when injected beams pass through the first data recording region and reading the header including said information;

producing a push-pull signal in response to the signals detected;

determining a polarity variation of the produced push-pull signal and a changing of the header data; and inverting a polarity of a tracking error signal detected in response to the determining results.

26. The reproducing method device of claim 25, wherein said information accounts for less than all of the data included in said header.

27. The reproducing method of claim 25, wherein said information corresponds to a pattern of several bits.

28. The reproducing method of claim 25, wherein said information is a post amble of said header.

* * * * *